(12) United States Patent
Takagawa et al.

(10) Patent No.: US 10,239,692 B2
(45) Date of Patent: Mar. 26, 2019

(54) ARTICLE TRANSPORT FACILITY

(71) Applicant: Daifuku Co., Ltd., Osaka-shi (JP)

(72) Inventors: Natsuo Takagawa, Hinocho (JP);
Toshikazu Kato, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/685,548

(22) Filed: Aug. 24, 2017

(65) Prior Publication Data
US 2018/0057261 A1 Mar. 1, 2018

(30) Foreign Application Priority Data

Aug. 29, 2016 (JP) ................. 2016-167197

(51) Int. Cl.
*B65G 1/00* (2006.01)
*B65G 1/02* (2006.01)
*B65G 1/04* (2006.01)
*G05B 19/418* (2006.01)

(52) U.S. Cl.
CPC ..... *B65G 1/0492* (2013.01); *G05B 19/41895* (2013.01); *B65G 2203/0283* (2013.01); *B65G 2811/0673* (2013.01); *B65G 2811/093* (2013.01)

(58) Field of Classification Search
None
See application file for complete search history.

(56) References Cited

U.S. PATENT DOCUMENTS

| 7,591,630 B2 * | 9/2009 | Lert, Jr. ............. | B65G 1/0492 414/807 |
| 7,735,624 B2 * | 6/2010 | Koide ................. | B65G 1/0421 198/346.1 |
| 2006/0069470 A1 | 3/2006 | Campbell et al. | |
| 2007/0068770 A1 | 3/2007 | Koide et al. | |

FOREIGN PATENT DOCUMENTS

| JP | 2007213495 A | 8/2007 |
| JP | 4232112 B2 | 12/2008 |
| JP | 4340976 B2 | 7/2009 |

* cited by examiner

*Primary Examiner* — Kavel Singh
(74) *Attorney, Agent, or Firm* — The Webb Law Firm

(57) ABSTRACT

A transport vehicle controller causes a travel speed of the corresponding one of the plurality of article transport vehicles to which the transport vehicle controller is provided to be reduced based on position information of corresponding one of the plurality of article transport vehicles to which the transport vehicle controller is provided and the position information on another of the plurality of article transport vehicles if a separation distance between the corresponding one of the plurality of article transport vehicles to which the transport vehicle controller is provided and the another of the plurality of article transport vehicles is less than, or equal to, a set separation distance.

9 Claims, 6 Drawing Sheets

ARTICLE TRANSPORT FACILITY

CROSS-REFERENCE TO RELATED APPLICATION

This application claims priority to Japanese Patent Application No. 2016-167197 filed Aug. 29, 2016, the disclosure of which is hereby incorporated in its entirety by reference.

FIELD OF THE INVENTION

The present invention relates to an article transport facility that comprises a plurality of the article transport vehicles each of which is configured to travel along a track installed to extend by way of a plurality of article transfer locations.

BACKGROUND ART

An example of an article transport facility including a plurality of article transport vehicles (3) which travel along a track (2) to transfer articles at a plurality of article transfer locations is disclosed in JP No. 4232112 B2. Note that the reference numerals in parentheses in the present BACKGROUND ART section are those used in this reference. The track (2) of the article transport facility of the example in this reference is linear, and is of a type with two ends including one end and an opposite end. In addition, two article transport vehicles (3) are provided (3a, 3b). One ground side controller (14) which controls the traveling of the two article transport vehicles (3 (3a, 3b)) is provided in the article transport facility. The ground side controller (14) and each article transport vehicle (3 (3a, 3b)) communicate with each other using an optical transmission device (16, 17). Provided at each end of the track (2) is an optical position detecting sensor (15) for detecting the positions of article transport vehicles (3 (3a, 3b)) along the track (2) by measuring the distance between each end of the track and the article transport vehicle (3) that is closer to that end. The detection information from the position detecting sensors (15) is inputted into the ground side controller (14). The ground side controller (14) manages the operations of the article transport vehicles (3 (3a, 3b)) on the track (2) based on the detection information from the position detecting sensors (15).

Thus, when the track (2) is linear in shape, the ground side controller (14) can control the article transport vehicles (3) such that they do not come into contact with each other, based on the position of each article transport vehicle (3) detected by the detection sensor (15) provided at each end portion of the track (2). However, when the track (2) is curved, there is a blind spot in the detection area of a position detecting sensor (15); thus, providing a position detecting sensor (15) only at each end is insufficient to perform a proper control. JP4340976 B2 discloses an article transport facility in which the track (K) along which article transport vehicles (3) travel has a curved portion. The track (K) consists of two straight sections (L1, L2), and a curved section (R) located between the two straight sections (L1, L2). In this article transport facility, optical position detecting sensors (15) are located at both ends and at outward locations of the curved section of the track (K) to detect the positions of the article transport vehicles (3) in each straight section (L1, L2) and in areas partially including the curved section (R). Further, the article transport vehicles (3) are prevented from coming into contact with each other by controlling the article transport vehicles (3) such that only one is exclusively allowed to enter the curved section (R).

SUMMARY OF THE INVENTION

In light of the background described above, it is desirable to prevent the article transport vehicles from coming into contact with each other by properly detecting the position of each article transport vehicle even when the track along which a plurality of article transport vehicles travel include a curved section.

In light of the above, in one embodiment, an article transport facility comprises: a plurality of the article transport vehicles each of which is configured to travel along a track installed to extend by way of a plurality of article transfer locations; position detectors each of which is configured to detect a position of corresponding one of the plurality of article transport vehicles along the track; a managing controller configured to control operation of each of the plurality of article transport vehicles based on position information detected by the position detectors, wherein each of the plurality of article transport vehicles includes a transport vehicle controller configured to cause corresponding one of the plurality of article transport vehicles to travel at least from a transport origin for an article to a transport destination, based on a command from the managing controller, wherein the track includes a curved section, wherein markers are placed at a plurality of locations along a direction in which the track extends, each of the markers indicating an absolute position along the track, wherein each of the plurality of article transport vehicles is provided with corresponding one of the position detectors, wherein each of the position detectors is configured to detect an absolute coordinate of corresponding one of the plurality of article transport vehicles along the track based on one or more of the markers, and is configured to provide position information including information on the absolute coordinate to at least other one or more of the article transport vehicles, through a wireless network, wherein a transport vehicle controller causes a travel speed of the corresponding one of the plurality of the article transport vehicles to be reduced based on position information of the corresponding one of the plurality of article transport vehicles to which the transport vehicle controller is provided and position information of another of the plurality of article transport vehicles, if a separation distance between the corresponding one of the article transport vehicles and the another of the plurality of article transport vehicles along the track is less than, or equal to, a set separation distance specified in advance.

Here, the absolute position is information about a position along the track. And the absolute position is information which has a resolution that depends on the density of the markers installed at the plurality of locations. Further, the density of the installed markers is a density that depends on the separation distance(s) between the markers along at least the direction along which the track extends. In addition, the absolute coordinate is information about the position of the article transport vehicle on the track. Although an absolute coordinate is a value specified based on one or more absolute positions, it is information for which there is no theoretical limit on its resolution. However, in practice, the ability (for example, resolution for detecting the markers) of the position detector is limited; so, the resolution for the absolute coordinate depends on the ability of the position detector. An absolute coordinate has a greater resolution than at least the resolution of absolute positions.

And, with the arrangement described above, the position information which includes the absolute coordinate detected by the position detector mounted in the article transport vehicle is also provided to other article transport vehicle(s) through a wireless network. Therefore, each article transport vehicle can properly control its own traveling along the track using position information of its own and for other vehicle(s). The position detectors detect absolute coordinates of article transport vehicles based on the markers located at a plurality of locations along a direction along which the track extends, instead of by measuring the distance between the article transport vehicles and one end of the track. Therefore, each position detector can detect the absolute coordinate of its article transport vehicle using the same method for all sections of the track even if the track includes a curved section; thus, each transport vehicle controller can allow its article transport vehicle to travel without having to require an operation to exclude other vehicles, etc. in the curved section. In addition, based on the position information of its own vehicle, and the position information of another vehicle, each transport vehicle controller can also calculate the separation distance which is an inter-vehicle distance between its own vehicle and another vehicle. In other words, each transport vehicle controller can control the travel speed of its own vehicle based on the separation distance to prevent any contact between its own vehicle and another vehicle. As such, with the present arrangement described above, it is possible to prevent the article transport vehicles from coming into contact with each other by properly detecting the position of each article transport vehicle even when the track along which a plurality of article transport vehicles travel include a curved section.

Additional features and advantages of the article transport facility will be made apparent from the following description of the embodiments given with reference to the attached drawings.

DETAILED DESCRIPTION OF EMBODIMENTS

Figure 1:
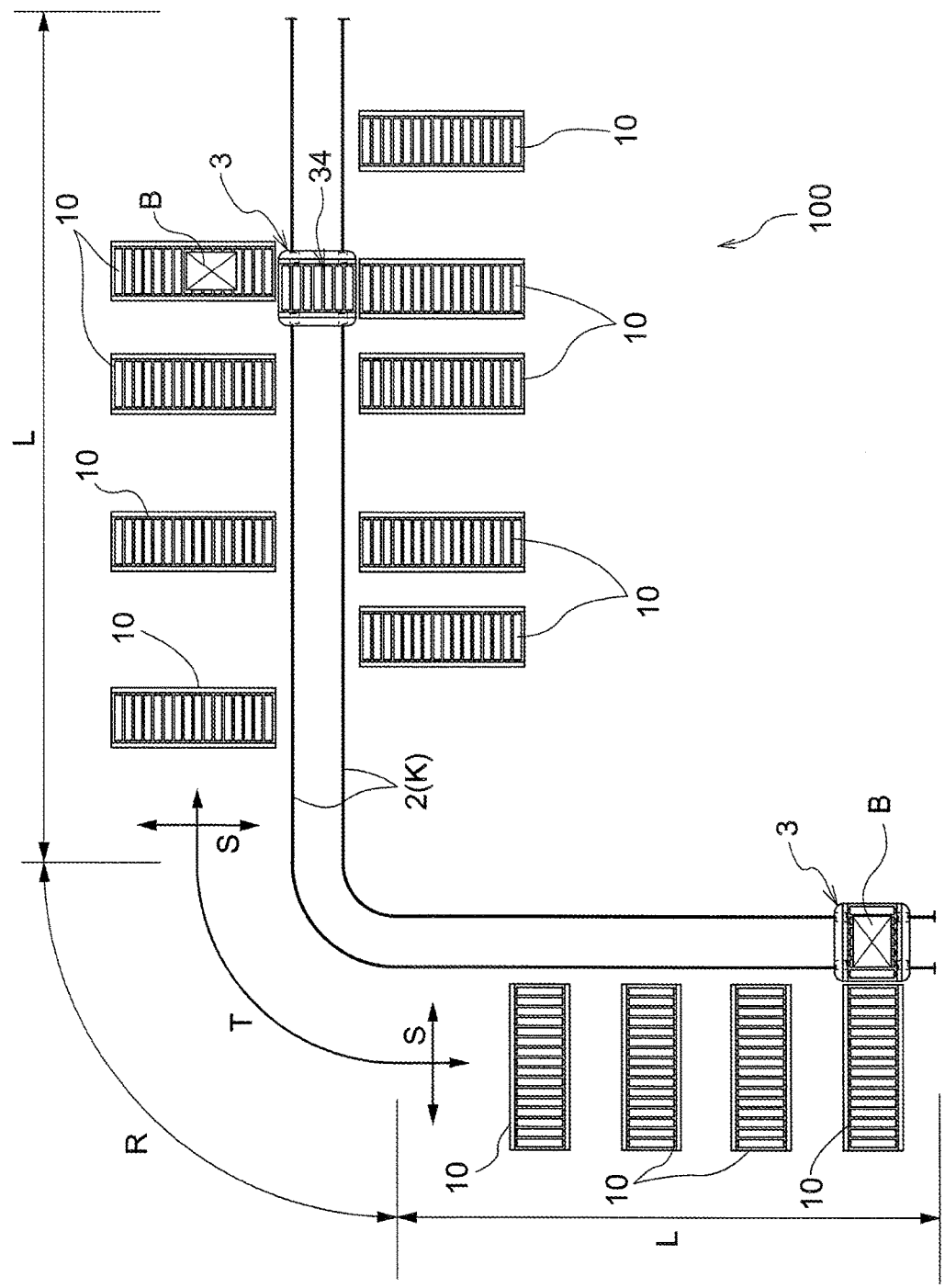
FIG. 1 is a plan view of an article transport facility.

Embodiments of an article transport facility 100 are described with reference to the drawings. As shown in FIG. 1, the article transport facility 100 includes a plurality of article transport vehicles 3 each of which is configured to travel on and along a track K installed to extend by way of, or adjacent, a plurality of stations 10 (article transfer locations). Note that the track K extending "by way of" a plurality of stations 10 means that the track K extends sufficiently close to the stations 10 such that an article transport vehicle 3 configured to travel along the track K can have an article transferred to and from each of the plurality of stations 10. The track K shown in FIG. 1 consists of straight sections L and a curved section R, and is a type with ends including one end and an opposite end. Each article transport vehicle 3 travels backward and forward along the track K to transport articles B, one article B at a time, between a plurality of stations 10. In the present embodiment, the track K is formed by a pair of travel rails 2, which defines a travel path, installed on the floor surface. The stations 10 are spaced apart from each other along the direction T (which is a function of position) along which the travel rails 2 extend. The stations 10 are located on both sides, along a width direction S, of the travel rails 2 in each straight section L where the width direction is a horizontal direction that is perpendicular to the (position dependent) direction along which the pair of travel rails 2 extend.

The stations 10 include a plurality of stations 10 such as, among other possibilities, a carry out station to which a carry out conveyor is provided for transporting an article B which has been retrieved out of an article storage rack (not shown), a carry in station to which a carry in conveyor is provided for transporting an article B which is being carried into the article storage rack, a take in station to which a take in conveyor is provided for transporting an article B which is being brought into the storage facility from outside thereof, and a take out station to which a take out conveyor is provided for transporting an article B that is being taken out to the outside of the storage facility. For example, any one of the plurality of the stations 10 can be designated as the transport origin (location from which an article is transported) whereas another of the plurality of the stations 10 can be designated as the transport destination (location to which the article is transported). When an article transport vehicle 3 is to travel to a transport origin, the transport origin is designated as the target travel position for the article transport vehicle 3. And when an article transport vehicle 3 is to travel to a transport destination, the transport destination is designated as the target travel position of the article transport vehicle 3.

Figure 2:
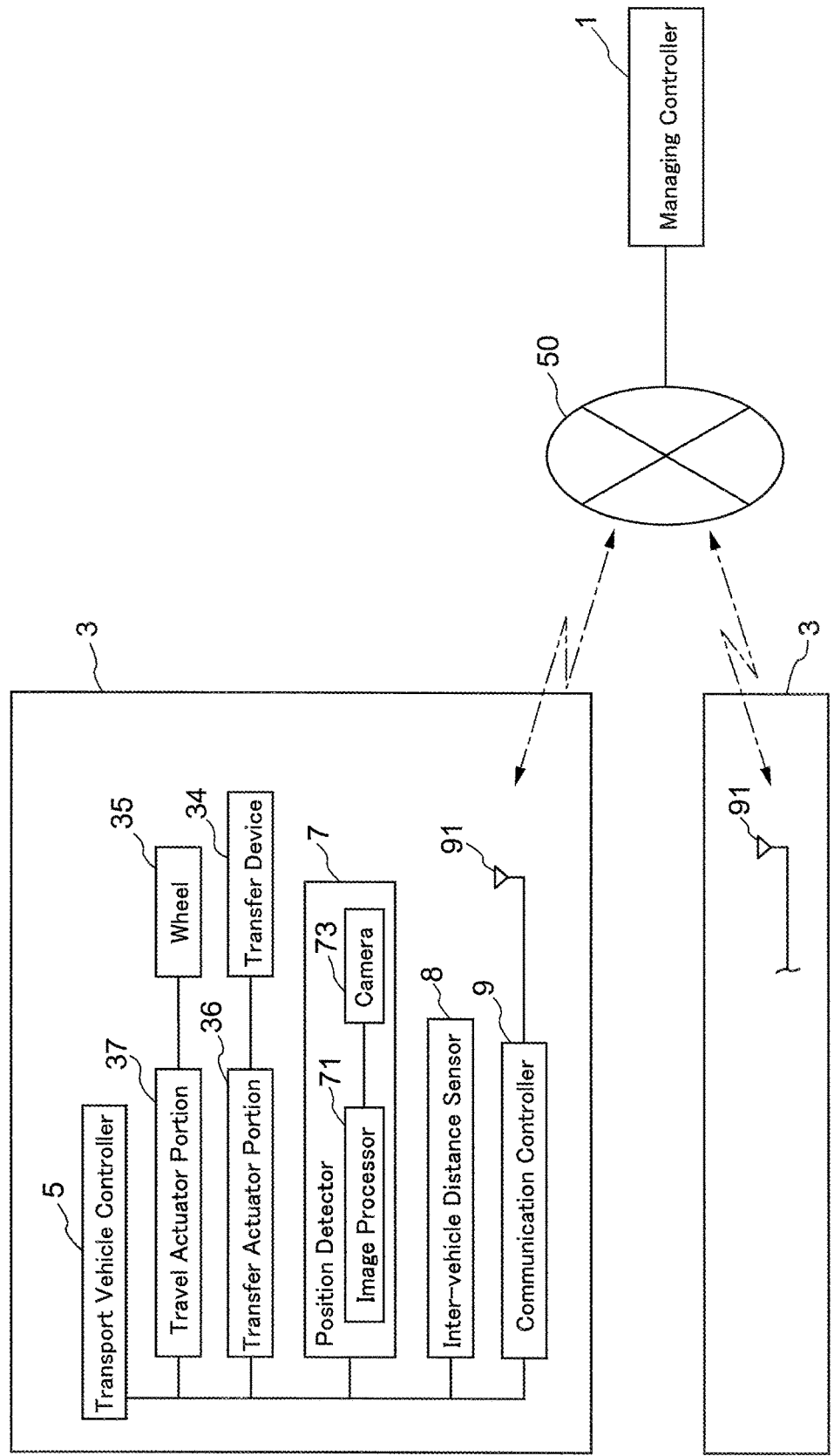
FIG. 2 is a block diagram schematically showing an arrangement of the article transport facility.

As shown in FIG. 2, each article transport vehicle 3 has a plurality of wheels 35 that travel on the travel rails 2, and a transfer device 34, such as a roller conveyor, configured to transfer an article B between itself (article transport vehicle 3) and a station 10. The transfer device 34 is actuated by a transfer actuator portion 36. The transfer actuator portion 36 includes, among other parts, an actuator, such as an electric motor for actuating the roller conveyor, and a drive circuit that includes an inverter circuit for driving the actuator. The wheels 35 include driven wheels that are driven by a travel actuator portion 37, and freely rotatable wheels. It is preferable that the driven wheels are located on the side of the article transport vehicle 3 that becomes the inner side when the article transport vehicle 3 travels in the curved section R of the travel rails 2. The travel actuator portion 37 includes, among other things, an electric drive motor for providing rotating force to the wheels 35, and a drive circuit which includes an inverter circuit for driving the drive motor.

Each article transport vehicle 3 further includes a transport vehicle controller 5, a position detector 7, an inter-vehicle distance sensor 8, a communication controller 9, and a communication antenna 91. Each of various controllers, and the image processor includes a CPU and peripheral circuits including a memory circuit and a circuit for communicating with various components such as actuators and sensors, and may be a microcomputer, with algorithms in the form of software that is stored and executable by the CPU for performing the required functions disclosed in the present specification. Based on instructions from a managing controller 1 described below, the transport vehicle controller 5 causes an article transport vehicle 3 to travel at least from a transport origin for an article B to a transport destination, and also to transfer the article at the transport origin and at the transport destination. In other words, the transport vehicle controller 5 actuates the wheels 35 through the travel actuator portion 37, and actuates the transfer device 34 through the transfer actuator portion 36. The position detector 7 detects the position, along the track K, of the article transport vehicle 3 to which the position detector 7 is provided. Although detailed description is provided below, in the present embodiment, the position detector 7 detects an absolute coordinate or coordinates of the article transport vehicle 3 along the track K. The inter-vehicle distance sensor 8 projects light for measurement in its travel direction (front and back direction) of the article transport vehicle 3 to detect the distance to any article transport vehicle 3 that is located close to it. The communication controller 9 and the communication antenna 91 provide at least other article transport vehicles 3 with position information (position information on the article transport vehicle 3) which includes information on the absolute coordinate mentioned above, through a communication network 50. In the present embodiment, the communication controller 9 and the communication antenna 91 are adapted for wireless-communications (for example, wireless LAN); and, the network 50 is a wireless network. Note that the network 50 may consist of a several different networks that are connected to each other. For example, the network 50 may consist of a wireless network and a wired network connected to each other. In addition, the network 50 may include a network with which the article transport vehicles 3 communicate directly with each other.

As shown in FIG. 2, the article transport facility 100 includes a managing controller 1 configured to control operation of each of the article transport vehicles 3 based on the position information detected by the position detectors 7. The managing controller 1 is also connected to the network 50, and obtains position information (position information for article transport vehicles 3) which includes information on the absolute coordinates mentioned above through the network 50. That is, the position detector 7 also provides the managing controller 1 with position information through the network 50. And the managing controller 1 controls operation of each article transport vehicle 3 based on the current position of the article transport vehicle 3. As described above, because the position information for each article transport vehicle is communicated through the network 50, the managing controller 1 can properly obtain the position information for all of the article transport vehicles 3 through the network 50, without having to obtain position information from the article transport vehicles 3 through other means of communication or connecting means. Note that managing controller may be connected to the network 50 through a wire or wirelessly and that it is sufficient for the managing controller 1 to be connected to the network 50 (wireless network) used by the article transport vehicles 3. FIG. 2 shows an example in which the managing controller 1 is connected to the network 50 through a wire.

The managing controller 1 designates the article transport vehicle 3 that is nearest to the transport origin based on the position information for each article transport vehicle 3, and issues a transport command for an article B to the designated article transport vehicle 3. The transport vehicle controller 5 controls the travel actuator portion 37 and the transfer actuator portion 36 based on the transport command to cause the article transport vehicle 3 to perform the transferring and transporting of the article B. It is preferable that each article transport vehicle 3 performs traveling (autonomous traveling) and transferring of the article B under an autonomous control by the transport vehicle controller 5. Note that in order to make such autonomous control possible, various sensors, such as a load presence sensor configured to detect the presence of an article B on the transfer device 34, may be provided to the article transport vehicle 3.

Figure 3:
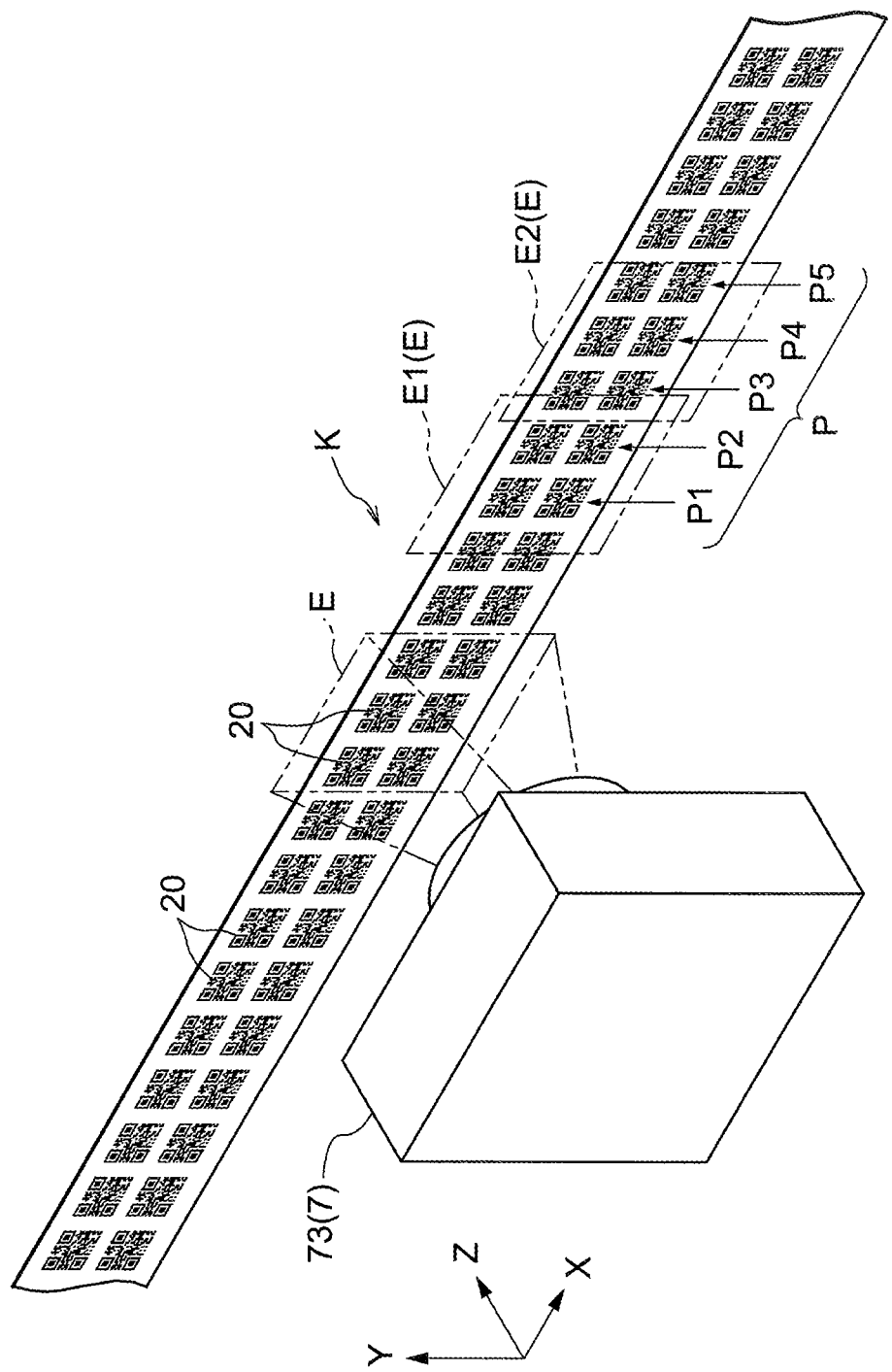
FIG. 3 is an explanatory drawing schematically illustrating a principle for detecting a position with a position detector.

Incidentally, since a plurality of article transport vehicles 3 exist on the track K, each transport vehicle controller 5 needs to be aware of the position of its own vehicle 3 as well as the positions of other vehicles 3, in order to perform proper autonomous traveling. Therefore, each article transport vehicle 3 is provided with a position detector 7. The position detector 7 mounted on each article transport vehicle 3 detects the absolute coordinates of the article transport vehicle 3 on the track K based on markers 20 provided along the track K. The track K which includes the curved section R is provided with markers 20 each of which indicates an absolute position along the track K are provided at a plurality of locations. It is preferable that, as shown in FIG. 3, a plurality of markers 20 are located one next to another, and in one or more rows, along the track K. In the present embodiment, an example is illustrated in which each marker 20 is a two dimensional barcode. However, the invention is not limited to such an arrangement, and each marker 20 may be a one dimensional barcode, or a plate with alphanumeric characters displayed on it, among other possibilities.

Here, an absolute position ("P" as described below with reference to FIGS. 3 and 4) is information about a position along the track K. And the absolute positions P are information which has a resolution that depends on the density of the markers 20 installed at a plurality of locations. In addition, the density of the markers 20 installed is a density that depends on the distance(s) between any two markers at least along the direction in which the track K extends. In addition, absolute coordinates ("Q" described below with reference to FIG. 4) is information on the position of an article transport vehicle 3 on the track K. Although an absolute coordinate Q is a value specified based on one or more absolute positions P, it is information for which there is no theoretical limit on its resolution. However, in practice, the ability (for example, resolution for detecting the marker 20) of the position detector 7 is limited; so, the resolution for the absolute coordinate Q depends on the ability of the position detector 7. Here, in the present embodiment, the ability means, for example, the resolution of the camera 73 and the resolution of images taken with the camera 73, as described below. Therefore, an absolute coordinate Q has a resolution that is at least greater than the resolution of the absolute positions P.

The position detector 7 has a camera 73 configured to capture images of the markers 20 and an image processor 71. The image processor 71 recognizes information about an absolute position P indicated by a marker 20 based on the image taken by the camera 73, and detects absolute coordinates Q of the article transport vehicle 3. The size and the position of each marker 20 is set such that, as shown in FIG. 3, it is possible to include, for example, six markers 20 in one image (imaging area E) of the camera 73. The image processor 71 recognizes (or performs image processing on) the information on an absolute position indicated by a marker 20 (two dimensional barcode) by performing image processing of the two dimensional barcode in the image taken by the camera 73. The same is true even if each marker 20 is a one-dimensional barcode, or a plate with alphanumeric characters. In case of alphanumeric characters, for example, the absolute position may be recognized by performing an OCR (Optical Character Recognition).

The position detector 7 can calculate the relationship between an absolute position indicated by any marker 20 and the position of the camera 73 based on the relationship between the position of the camera 73 with respect to a so-called world coordinate system (actual three dimensional coordinate system) and the coordinate system of the camera (referred to as the "camera coordinate system") projected on an image taken by the camera 73. In other words, the coordinates of a marker 20 obtained with respect to the camera coordinate system in the image taken by the camera 73 are taken to correspond to the absolute position indicated by the marker 20 to calculate the absolute coordinates of the camera 73 (i.e., the origin of the camera coordinate system in the present example) based on the relationship between the absolute position and the coordinates of the marker 20 with respect to the camera coordinate system. As shown in FIG. 3, the absolute coordinates can be obtained as coordinates with respect to a three-dimensional rectangular coordinate system which has an X-axis, a Y-axis, and a Z-axis.

However, in the present embodiment, the markers 20 are located at specified positions with respect to the travel rails 2 (for example, by supporting the markers 20 by brackets supported by one of the rails 2). And because the article transport vehicle 3 which mounts the camera 73 also travels on and along the travel rails 2, the Y-coordinate and the Z-coordinate can be considered to be substantially fixed. Needless to say, the Y-coordinate and the Z-coordinate may vary depending on, among other factors, individual differences, and/or bending of, the travel rails 2 and the wheels 35, changes that may occur over time in any of them, the vertical positional shift of an article transport vehicle 3 due to the presence or non-presence of an article B thereon, any errors in the attaching positions of the markers 20 with respect to the travel rails 20. In such cases, it would naturally be preferable to correct the Y-coordinate and the Z-coordinate based on results of image recognition.

Figure 4:
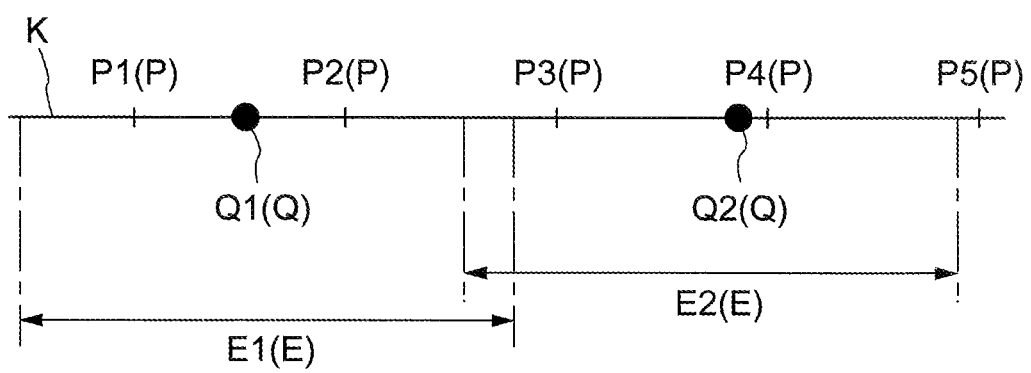
FIG. 4 is an explanatory drawing schematically illustrating a relationship between absolute positions and an absolute coordinate.

FIG. 4 illustrates an example of a principle for obtaining absolute positions P along the track K indicated by markers 20 and the absolute coordinate Q of an article transport vehicle 3 (i.e. absolute coordinate Q of the camera 73), using only the x-axis as a representative axis. For example, when the imaging area E is "E1" shown in FIG. 3, an absolute coordinate "Q1" is derived based on absolute positions "P1" and "P2" shown in FIG. 4. Similarly, when the imaging area E is "E2" shown in FIG. 3, an absolute coordinate "Q2" is derived based on absolute positions "P3" and "P4" shown in FIG. 4.

As described above, a plurality of article transport vehicles 3 are located along the track K. Although the managing controller 1 controls operations of the article transport vehicles 3 by issuing transport commands so as to prevent the article transport vehicles 3 from contacting each other on the track K, each article transport vehicle 3 operates (i.e., performs traveling and transferring) under an autonomous control after receiving a transport command. For example, it may take longer than a standard amount of time for an article transport vehicle 3 to receive an article B depending on how the article B is placed on a particular station 10. Also, an obstacle, etc., may appear on the track K causing the article transport vehicle 3 to decelerate, which in turn causes the article transport vehicle 3 to take longer than a standard amount of time to travel a given distance. And when such an event occurs, article transport vehicles 3 may come into contact with each other at a position which the managing controller 1 did not anticipate.

In the present embodiment, such contact can be prevented by autonomous control by the transport vehicle controller 5. As described above, each article transport vehicle 3 is provided with a position detector 7. And the detected position information is provided at least to other article transport vehicles 3 through the network 50. As described below with reference to the flowchart of FIG. 6, the transport vehicle controller 5 causes the travel speed V of its own vehicle 3 (the article transport vehicle 3 to which the transport vehicle controller is provided) to be reduced (#3->#4) based on the position information of its own vehicle 3 and the position information of other vehicles 3, if the separation distance D between the article transport vehicles along the track K is less than, or equal to, a set separation distance D1 specified in advance. Therefore, a contact is prevented between the article transport vehicle 3 to which the transport vehicle controller 5 is provided and another article transport vehicle 3 traveling ahead in the travel direction. Note that if and when the separation distance D exceeds the set separation distance D1, the travel speed V of the article transport vehicle 3 (that the transport vehicle controller 5 is provided to) is returned to a standard travel speed.

Naturally, even if the separation distance D between the article transport vehicle 3 to which the travel controller 5 is provided and another article transport vehicle 3 located behind it with respect to the traveling direction is less than, or equal to, the set separation distance D1, the article transport vehicle 3 to which the travel controller 5 would not come into contact with another article transport vehicle 3 from behind. Therefore, it is preferable that the transport vehicle controller 5 causes the travel speed V of its own vehicle 3 to be reduced if the separation distance D between its own vehicle 3 and the article transport vehicle 3 located ahead with respect to the traveling direction is less than, or equal to, the set separation distance D1 specified in advance. Further, it is preferable that the restricting distance D2 which is less than the set separation distance D1 is set in advance, and that the transport vehicle controller 5 causes its own vehicle 3 to stop if the separation distance D is less than, or equal to, the restricting distance D2 (#2->#5).

Figure 5:
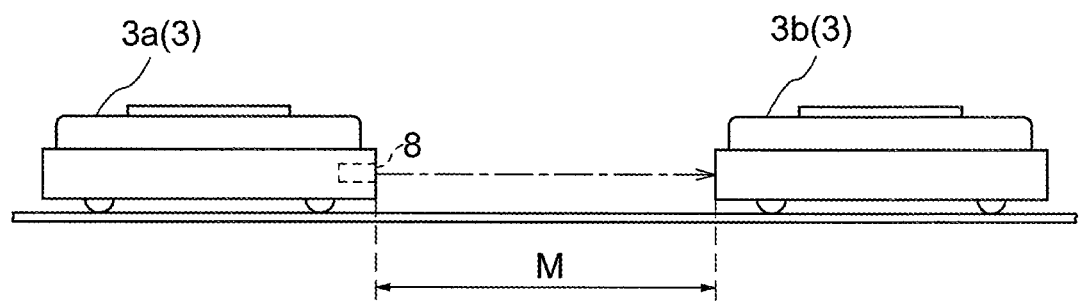
FIG. 5 is an explanatory drawing schematically illustrating a principle for detection with an inter-vehicle distance sensor.

Furthermore, as described above, inter-vehicle distance sensors 8 are mounted in each article transport vehicle 3. In light of the fact that communication through the network 50 takes a certain amount of time, it is preferable that a control that uses the detection result from the inter-vehicle distance sensors 8 is performed as a fail-safe measure. As schematically shown in FIG. 5, each inter-vehicle distance sensor 8 is configured to detect the inter-vehicle distance M to another article transport vehicle 3 (a vehicle 3a traveling ahead) that is located ahead (with respect to the traveling direction) of the article transport vehicle 3 to which the inter-vehicle distance sensor 8 is provided and which is the vehicle 3b traveling behind the vehicle 3a traveling ahead. While not shown, in the present embodiment, since each article transport vehicle 3 can travel in both directions along the track K, two inter-vehicle distance sensors 8 are installed on each article transport vehicle 3 with one on its front side and the other on its the back side. In addition, while not shown, inter-vehicle distance sensors 8 are also installed to the vehicle 3b traveling ahead. The transport vehicle controller 5 causes its own vehicle 3 (the vehicle 3a traveling behind) to stop if the inter-vehicle distance M detected by an inter-vehicle distance sensor 8 is less than, or equal to, a lower limit inter-vehicle distance M1 specified in advance (#1->#5). Note that the lower limit inter-vehicle distance M1 is set to be less than the restricting distance D2.

Figure 6:
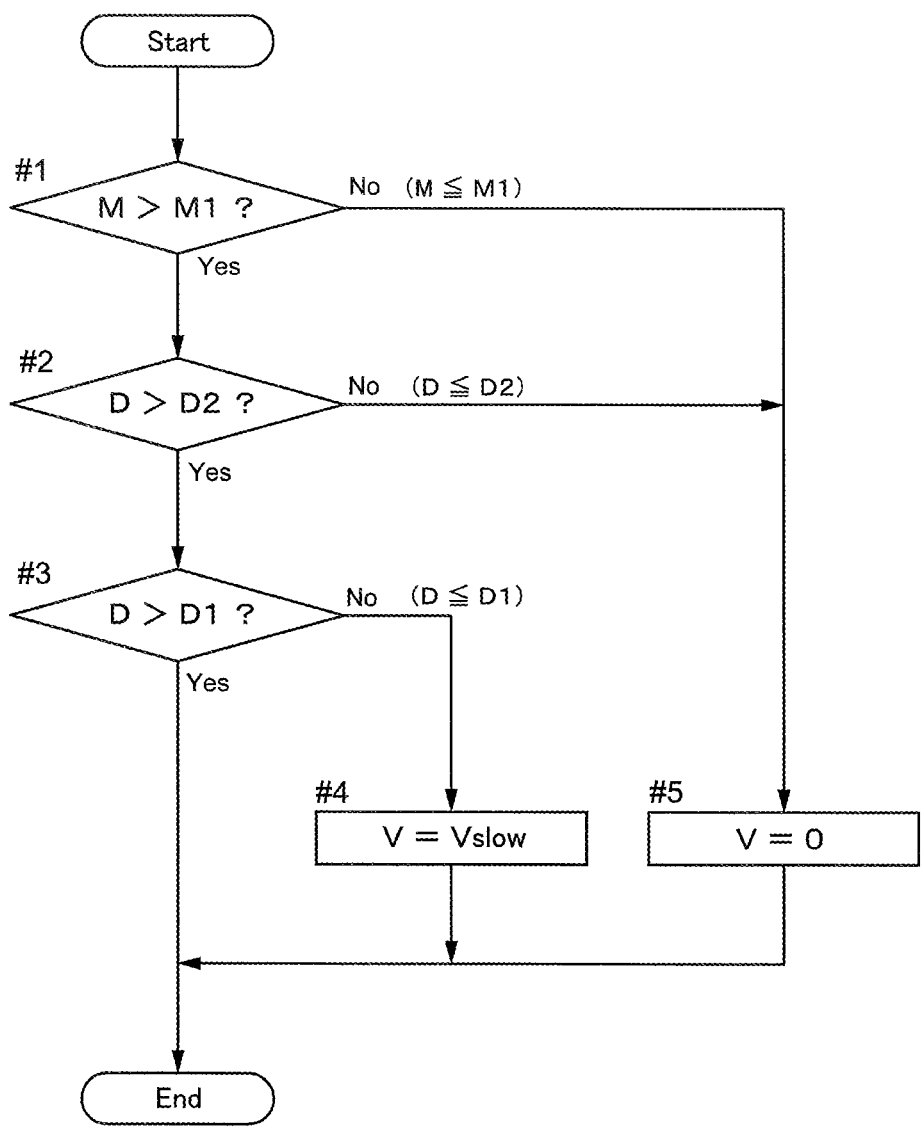
FIG. 6 is a flowchart illustrating an example of a speed control of an article transport vehicle.

A speed control of an article transport vehicle 3 by the transport vehicle controller 5 is described next with reference to the flowchart of FIG. 6. In the present embodiment, the transport vehicle controller 5 of the vehicle 3a traveling behind (its own vehicle) determines the separation distance D to the vehicle 3b traveling ahead (and the inter-vehicle distance M) in three steps (#1, #2, and #3). In step #1, it is determined whether the inter-vehicle distance M detected by the inter-vehicle distance sensor 8 is less than, or equal to, the lower limit inter-vehicle distance M1. If M is less than, or equal to, M1, the transport vehicle controller 5 controls the travel speed V of the article transport vehicle 3 such that it is reduced to zero to stop the article transport vehicle 3 (#5), as described above.

When it is determined in step #1 that the inter-vehicle distance M is greater than the lower limit inter-vehicle distance M1, it is subsequently determined, in step #2, whether the separation distance D is less than, or equal to, the restricting distance D2. If D is less than, or equal to, D2, the transport vehicle controller 5 controls the travel speed V of the article transport vehicle 3 such that it is reduced to zero to stop the article transport vehicle 3 (#5), as described above.

When it is determined in step #2 that the separation distance D is greater than the restricting distance D2, it is subsequently determined, in step #3, whether the separation distance D is less than, or equal to, the set separation distance D1. If D is less than, or equal to, D1, the transport vehicle controller 5 causes the travel speed V of the article transport vehicle 3 to be reduced to a slow speed Vslow (#4), as described above. Note that the slow speed Vslow is a speed that is preferably substantially lower than a speed at which the article transport vehicles 3 usually travel and that is preferably such a speed that, when the transport vehicle controller 5 issues a stop command, the article transport vehicle 3 can come to a stop within a stopping period specified in advance, or before traveling a distance greater than a stopping distance specified in advance.

Incidentally, for the type of track K with ends, there is no place for an article transport vehicle 3 to travel to after reaching an end of the track K if an article transport vehicle 3 can travel only in one direction along the track K; so, the article transport vehicles 3 must be allowed to travel in both directions. And along the track K along which the article transport vehicles 3 are allowed to travel in both directions, two article transport vehicles 3 may sometimes travel in directions that would bring them closer to each other. When the article transport vehicles 3 are allowed to travel only in one direction, the relative speed of two (front and back) article transport vehicles 3 is a speed obtained by subtracting the travel speed of the front article transport vehicle 3 (3b) (on the front side with respect to the traveling direction) from the travel speed of the back article transport vehicle 3 (3a). In other words, the greatest obtainable relative speed is the travel speed of the back article transport vehicle 3 (3a) (when the front article transport vehicle 3 (3b) is at rest). On the other hand, when the article transport vehicles 3 are allowed to travel in both directions, and when two article transport vehicles 3 are traveling closer to, or toward, each other, the relative speed is the sum of the travel speeds of the two article transport vehicles 3. In other words, the relative speed for the article transport vehicles 3 traveling toward each other is at minimum the travel speed of one of the two article transport vehicles 3 (for example when the other article transport vehicle 3 is traveling at an extremely low speed or substantially at rest).

In other words, for a track K along which the article transport vehicles 3 are allowed to travel in both directions, two article transport vehicles 3 will come closer to each other sooner and at a greater rate compared with a track K along which the article transport vehicles 3 are allowed to travel only in one direction. Therefore, when the article transport vehicles 3 travel along a track K along which they are allowed to travel in both directions, it is preferable for each article transport vehicle 3 to quickly obtain position information of other article transport vehicles 3. It is conceivable to provide each article transport vehicle 3 with, for example, sensors for directly detecting a distance to another vehicle (e.g., the inter-vehicle distance sensor 8 described above with reference to FIG. 5, or an optical obstacle sensor such as a laser radar), as well as an optical communication device (e.g., optical transmission device (16, 17) of JP patent No. 4232112 (Patent Document 1), etc.) for transmitting warning or attention attracting information to other vehicles based on the detection result.

However, such devices use a principle of optics in many cases; thus, although they may be effective when the track K is linear in shape, they may have blind spots (or areas for which they do not function effectively) when the track K includes a curved section R. In addition, since the range of detection and the range of communication have limits even if the track K is linear in shape, detection of another vehicle and/or the timing for starting a responsive action may be delayed. In addition, as described above, for a track K along which the article transport vehicles 3 are allowed to travel in both directions, two article transport vehicles 3 will come close to each other sooner compared with a track K along which the article transport vehicles 3 are allowed to travel only in one direction; therefore, other vehicles 3 need to be detected that much more quickly.

In the present embodiment, even if the track K includes a curved section R, the position detector 7 of each article transport vehicle 3 can detect the absolute coordinates of the article transport vehicle 3 using the same method for all sections of the track K. And the transport vehicle controller 5 of each article transport vehicle 3 can allow its article transport vehicle 3 to travel without having to require an operation to exclude other vehicles, etc. in the curved section R. In addition, the transport vehicle controller 5 can control the travel speed of its own vehicle 3 and can prevent a contact between its own vehicle and other vehicle based on the position information of its own vehicle and the position information on other vehicles. In particular, an issue described above arises when the track K of the article transport facility 100 is a type with ends including one end and an opposite end. However, even in such a case, contact between article transport vehicles 3 can be properly prevented. In other words, the arrangement of the present embodiment is useful especially when the track K of the article transport facility 100 is a type with ends including one end and an opposite end.

Incidentally, in the present invention, as described above, an position detector 7 provided to each of the article transport vehicles 3 detects the absolute coordinates of the article transport vehicle 3; and, position information including the information on the absolute coordinates is transmitted through a wireless network. Further, a transport vehicle controller 5 provided to each of the article transport vehicle 3 causes the travel speed of the article transport vehicle 3 to be reduced based on the position information of its own vehicle and the position information of other vehicles, if the separation distance between the article transport vehicles 3 along the track K is less than, or equal to, a set separation distance. That is, in the present embodiment, each of two article transport vehicles 3, for example, performs the control described above by taking itself and the other vehicle into consideration. In other words, monitoring of two approaching article transport vehicles 3 is doubly performed so that the contact between the article transport vehicles can be more certainly prevented. In addition, since the identical hardware and software can be used in each article transport vehicle 3, the article transport vehicles 3 can be standardized. For example, when replacing an article transport vehicle 3 with another, or when adding one or more article transport vehicles 3 to the article transport facility 100, these new article transport vehicles 3 do not have to be prepared for a specific purpose, which provides advantages in terms of efficiency and cost.

In addition, when two article transport vehicles 3 are traveling toward each other along the track K along which the article transport vehicles 3 are allowed to travel in both directions as described above, each article transport vehicle 3 performs the detection of the other vehicle and the travel speed control of itself. Any contact between the article transport vehicles 3 can be prevented more certainly when both of the article transport vehicles 3 reduce their travel speeds com than when only one of the article transport vehicles 3 reduces its travel speed.

Other Embodiments

Other embodiments are described next. Note that any arrangement and feature of each embodiment described below does not have to be used or incorporated by itself but may be combined with any arrangement and feature of any other embodiment as long as such combination does not give rise to a contradiction.

Figure 7:
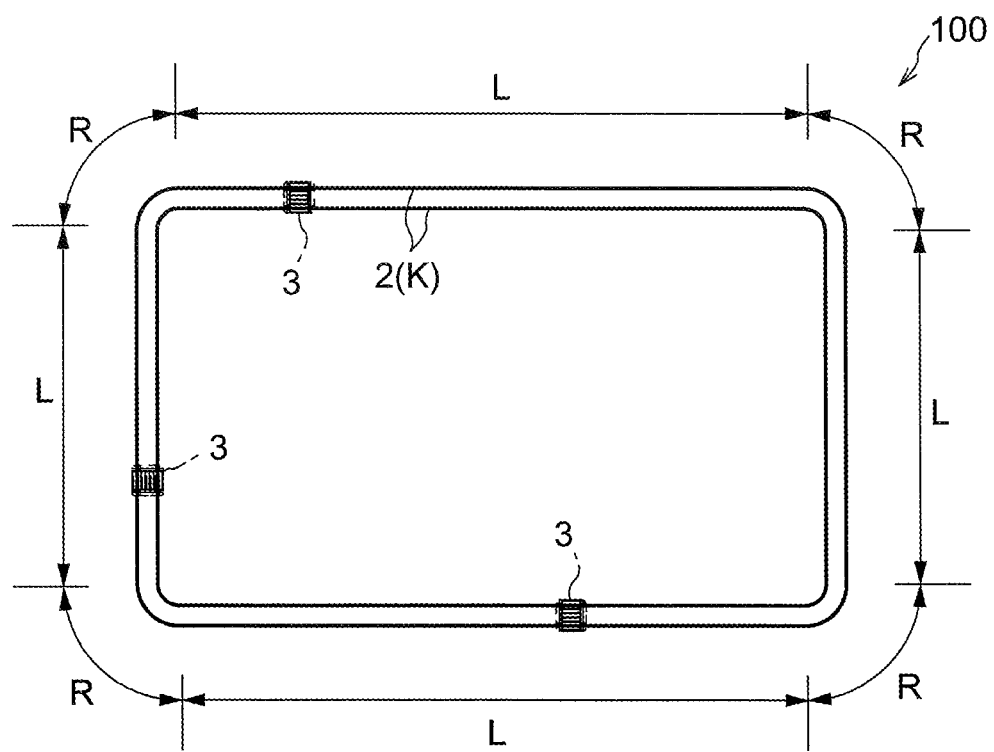
FIG. 7 is a plan view showing another example of an arrangement of an article transport facility.

(1) In the description above, an example is described in which, with reference to FIG. 1, the track K includes straight sections L and a curved section R, and is a type with two ends including one end and an opposite end. However, the track K of the article transport facility 100 does not have to be a type with two ends including one and an opposite end so long as it includes at least one curved sections R, and may form a loop such as an example shown in FIG. 7. In addition, although the tracks K in FIGS. 1 and 7 include straight sections L, a track K does not necessarily include any straight section L. The track K is only required to include at least one curved section R; and, the entire track K may be a curved section R, which may, for example, be a circular loop, an elliptical loop, a curved line with two ends, etc. Note that, if the track K forms a loop, the article transport vehicles 3 may be allowed to travel only in one direction since traveling around the loop once will put one at the beginning point of travel. However, even if the track K forms a loop, the article transport vehicles 3 may be allowed to travel in both directions.

(2) In the description above, an example is described in which the transport vehicle controller 5 of the vehicle 3a traveling behind (its own vehicle) determines the separation distance D (and the inter-vehicle distance M) to the vehicle 3b traveling ahead in three steps, i.e., Step #1, Step #2, and Step #3. The article transport vehicles 3 do not need to have any inter-vehicle distance sensor 8 installed therein. In such a case, the transport vehicle controller 5 of the vehicle 3a traveling behind (its own vehicle) does not perform step #1, and may determine the separation distance D to the vehicle 3b traveling ahead in two steps, i.e., Step #2 and Step #3 to control the travel speed of the article transport vehicle 3. In addition, in the embodiment described above, two kinds of speed controls (#4, #5) are performed depending on the separation distance D; however, only one kind of control for stopping the article transport vehicle 3 may be performed (#2->#5).

(3) In the description above, an example is described in which the article transport facility 100 includes two article transport vehicles 3. However, the facility 100 may include three or more article transport vehicles 3. When there are two article transport vehicles 3, the control for preventing a contact between the article transport vehicle 3 to which a transport vehicle controller 5 is provided and another article transport vehicle 3 to which its transport vehicle controller is provided can be performed by the article transport vehicle 3 to which the transport vehicle controller 5 is provided and the other vehicle 3 so that the control can be doubly performed. When there are three article transport vehicles 3, the control for preventing a contact between the article transport vehicle 3 to which a transport vehicle controller 5 is provided and either of the two other article transport vehicles 3 can be performed by the article transport vehicle 3 to which the transport vehicle controller 5 is provided and also by the other two vehicles 3 so that the control can be triply performed. It would be needless to state that there may be four or more article transport vehicles 3 in the facility. In other words, having three or more article transport vehicles 3 in the facility would not make the control for preventing contact between article transport vehicles 3 more difficult to perform. And even in such a case, the contacts between the vehicles 3 may be properly prevented because such control is performed by multiple vehicles 3.

Summary of Embodiments

The article transport facility described above is briefly summarized next.

An article transport facility comprises: a plurality of the article transport vehicles each of which is configured to travel along a track installed to extend by way of a plurality of article transfer locations; position detectors each of which is configured to detect a position of corresponding one of the plurality of article transport vehicles along the track; a managing controller configured to control operation of each of the plurality of article transport vehicles based on position information detected by the position detectors. In one embodiment, each of the plurality of article transport vehicles includes a transport vehicle controller configured to cause corresponding one of the plurality of article transport vehicles to travel at least from a transport origin for an article to a transport destination, based on a command from the managing controller, wherein the track includes a curved section, wherein markers are placed at a plurality of locations along a direction in which the track extends, each of the markers indicating an absolute position along the track, wherein each of the plurality of article transport vehicles is provided with corresponding one of the position detectors, wherein each of the position detectors is configured to detect an absolute coordinate of corresponding one of the plurality of article transport vehicles along the track based on one or more of the markers, and is configured to provide position information including information on the absolute coordinate to at least other one or more of the article transport vehicles, through a wireless network, wherein a transport vehicle controller causes a travel speed of the corresponding one of the plurality of the article transport vehicles to be reduced based on position information of the corresponding one of the plurality of article transport vehicles to which the transport vehicle controller is provided and position information of another of the plurality of article transport vehicles, if a separation distance between the corresponding one of the article transport vehicles and the another of the plurality of article transport vehicles along the track is less than, or equal to, a set separation distance specified in advance.

Here, the absolute position is information about a position along the track. And the absolute position is information which has a resolution that depends on the density of the markers installed at the plurality of locations. Further, the density of the installed markers is a density that depends on the separation distance(s) between the markers along at least the direction along which the track extends. In addition, the absolute coordinate is information on the position of the article transport vehicle on the track. Although an absolute coordinate is a value specified based on one or more absolute positions, it is information for which there is no theoretical limit on its resolution. However, in practice, the ability (for example, resolution for detecting the markers) of the position detector is limited; so, the resolution for the absolute coordinate depends on the ability of the position detector. An absolute coordinate has a greater resolution than at least the resolution of an absolute position.

And, with the arrangement described above, the position information which includes the absolute coordinate detected by the position detector mounted in the article transport vehicle is also provided to other article transport vehicle(s) through a wireless network. Therefore, each article transport vehicle can properly control its own traveling along the track using position information of its own and for other vehicle(s). The position detectors detect absolute coordinates of article transport vehicles based on the markers located at a plurality of locations along a direction along which the track extends, instead of by measuring the distance between the article transport vehicles and one end of the track. Therefore, each position detector can detect the absolute coordinate of its article transport vehicle using the same method over all sections of the track even if the track includes a curved section; thus, each transport vehicle controller can allow its article transport vehicle to travel without having to require an operation to exclude other vehicles, etc. in the curved section. In addition, based on the position information of its own vehicle, and the position information of another vehicle, each transport vehicle controller can also calculate the separation distance which is an inter-vehicle distance between its own vehicle and another vehicle. In other words, each transport vehicle controller can control the travel speed of its own vehicle based on the separation distance to prevent any contact between its own vehicle and another vehicle. As such, with the present arrangement described above, it is possible to prevent the article transport vehicles from coming into contact with each other by properly detecting the position of each article transport vehicle even when the track along which a plurality of article transport vehicles travel include a curved section.

Here, the plurality of the article transport vehicles are preferably configured to communicate with each other through one wireless network, wherein each of the plurality of article transport vehicles is preferably configured to communicate with the managing controller through the one wireless network.

With the arrangement described above, the managing controller and each article transport vehicle can share information easily through the same wireless network. Therefore, by sharing the position information of article transport vehicles, for example, the article transport vehicles can be prevented from coming into contact with each other by the managing controller controlling operations of the article transport vehicles while each article transport vehicle can prevent itself from coming into contact with other article transport vehicles. In other words, the article transport vehicles can be prevented from coming into contact with each other by a plurality of methods.

Here, in one embodiment, the track is preferably of a type with ends including one end and an opposite end.

The article transport vehicles can be allowed to travel one way, for example when the track forms a loop. However, for the type of track K with ends, there is no place for an article transport vehicle to travel to after reaching an end of the track if article transport vehicles are allowed to travel only in one direction along the track; so, the article transport vehicles must be allowed to travel in both directions. And along the track along which the article transport vehicles are allowed to travel in both directions, two of the article transport vehicles may sometimes travel in directions that would bring them closer to each other. When the article transport vehicles are allowed to travel only in one direction, the relative speed of two (front and back) article transport vehicles is a speed obtained by subtracting the travel speed of the front article transport vehicle (on the front side with respect to the traveling direction) from the travel speed of the back article transport vehicle. In other words, the greatest obtainable relative speed is the travel speed of the back article transport vehicle (when the front article transport vehicle is at rest). On the other hand, when the article transport vehicles are allowed to travel in both directions, and when two article transport vehicles are traveling closer to, or toward, each other, the relative speed is the sum of the travel speeds of the two article transport vehicles. In other words, the relative speed for the article transport vehicles traveling toward each other is at minimum the travel speed of one of the two article transport vehicles (for example, when the other article transport vehicle is traveling at an extremely low speed, for example, substantially at rest).

In other words, for a track along which the article transport vehicles are allowed to travel in both directions, two article transport vehicles will come closer to each other sooner and at a greater rate compared with a track along which the article transport vehicles are allowed to travel only in one direction. Therefore, when the article transport vehicles travel along a track along which they are allowed to travel in both directions, it is preferable for each article transport vehicle to quickly obtain position information of other article transport vehicles. It is conceivable to provide each article transport vehicle with, for example, sensors for directly detecting a distance to another vehicle (e.g., an optical obstacle sensor such as a laser radar), as well as an optical communication device (e.g., optical transmission device (16, 17) of JP patent No. 4232112 which is described in the BACKGROUND ART section, etc.) for transmitting warning or attention attracting information to other vehicles based on the detection result. However, such devices use a principle of optics in many cases; thus, although they may be effective when the track is linear in shape, they may have blind spots (or areas for which they do not function effectively) when the track includes a curved section. In addition, since the range of detection and the range of communication have limits even if the track is linear in shape, detection of another vehicle and/or the timing for starting a responsive action may be delayed. In addition, as described above, for a track along which the article transport vehicles are allowed to travel in both directions, two article transport vehicles will come close to each other sooner compared with a track along which the article transport vehicles are allowed to travel only in one direction; therefore, other vehicles need to be detected that much more quickly.

With the arrangement described above, each position detector can detect the absolute coordinate of its article transport vehicle using the same method for all sections of the track even if the track includes a curved section. And each transport vehicle controller can allow its article transport vehicle to travel without having to require an operation to exclude other vehicles, etc. in the curved section. In addition, based on the position information of its own vehicle and the position information of another vehicle, each transport vehicle controller can control the travel speed of its own vehicle to prevent any contact between its own vehicle and another vehicle. In particular, an issue described above arises when the track of the article transport facility is a type with ends including one and an opposite end. However, even in such a case, contact between article transport vehicles can be properly prevented. In other words, the arrangement of the present embodiment is useful especially when the track of the article transport facility is a type with ends including one end and an opposite end.

Also, in one embodiment the transport vehicle controller preferably causes a travel speed of corresponding one of the plurality of article transport vehicles to which the transport vehicle controller is provided to be reduced, if a separation distance to another of the plurality of article transport vehicles that is located ahead with respect to a traveling direction of the corresponding one of the plurality of article transport vehicles to which the transport vehicle controller is provided, is less than, or equal to, the set separation distance.

When there is another vehicle located forward of the article transport vehicle to which the particular transport vehicle controller is provided, and if the separation distance to that another vehicle is less than, or equal to, the set separation distance, then there is a possibility that the article transport vehicle to which the particular transport vehicle controller is provided may come into contact with the another vehicle. Here, if the travel speed of the article transport vehicle to which the particular transport vehicle controller is provided is reduced, the separation distance is reduced, so that the contact between the two vehicles becomes less likely. Reducing the travel speed of the article transport vehicle to which a particular transport vehicle controller is provided is not preferable when there is another vehicle located behind the article transport vehicle to which the particular transport vehicle controller is provided, and if the separation distance to the other vehicle is less than, or equal to, the set separation distance because the separation distance would be reduced further. Thus, in such a case, it is preferable to have the other vehicle reduce its travel speed. When viewed from the other vehicle, the article transport vehicle to which the particular transport vehicle controller is provided is the vehicle that is located forward of the other vehicle with respect to its travel direction, the travel speed of the other vehicle would be reduced based on the separation distance between the article transport vehicle located ahead of the other vehicle with respect to its travel direction.

In addition, in one embodiment, the transport vehicle controller preferably causes, corresponding one of the plurality of article transport vehicles to which the transport vehicle controller is provided, to stop, if the separation distance is less than, or equal to, a restricting distance which is set to be less than the set separation distance.

The separation distance between the article transport vehicle to which a particular transport vehicle controller is provided and another vehicle may gradually decrease depending on the relative travel speed of the other vehicle even if the travel speed of the article transport vehicle to which the transport vehicle controller is provided is reduced, and the two vehicle may come into contact with each other depending on the separation distance. By preventing the separation distance from decreasing by causing the article transport vehicle to which a particular transport vehicle controller is provided to stop, the possibility of the two vehicles coming into contact with each other would also be reduced. Since the possibility of the two vehicles coming into contact with each other arises only when the separation distance is small, It is preferable that the transport vehicle controller causes its own vehicle to stop, if the separation distance is less than, or equal to, a restricting distance which is set to be less than the set separation distance.

In addition, in one embodiment, each of the position detectors is preferably configured to provide position information to the managing controller through the wireless network, wherein the managing controller is preferably configured to control operation of each of the plurality of article transport vehicles based on one or more positions of the each of the plurality of article transport vehicles.

A managing controller configured to perform an overall control of the operations of a plurality of article transport vehicles is often provided in an article transport facility. Because the position information for each article transport vehicle is communicated through a wireless network, the managing controller can properly obtain the position information for all of the article transport vehicles through the wireless network, without having to obtain position information from the article transport vehicles through other means of communication or connecting means. Therefore, the structured of the article transport facility can be simplified. Note that managing controller may be connected to the wireless network through a wire or wirelessly and that it is sufficient for the managing controller to be connected to the wireless network used by the article transport vehicles.

In addition, in one embodiment, each of the markers preferably includes a one-dimensional or two-dimensional barcode which indicates at least the absolute position, wherein each of the position detectors preferably includes a camera configured to capture one or more images of one or more of the markers, and an image processor configured to recognize information about one or more absolute positions indicated by the one or more of the markers to detect the absolute coordinate of corresponding one of the plurality of article transport vehicles, based on one or more images taken by the camera.

The position detector can calculate the relationship between an absolute position indicated by any marker and the position of the camera based on the relationship between the position of the camera with respect to a so-called world coordinate system (actual three dimensional coordinate system) and the coordinate system of the camera (referred to as the "camera coordinate system") projected on an image taken by the camera. In other words, the coordinates of a marker obtained with respect to the camera coordinate system in the image taken by the camera are taken to correspond to the absolute position indicated by the marker to calculate the absolute coordinates of the camera (i.e., the origin of the camera coordinate system in the present example) based on the relationship between the absolute position and the coordinates of the marker with respect to the camera coordinate system. Because the resolution of the positions of the camera with respect to the coordinate system for a taken image is naturally greater than the resolution of the positions of the markers along the track, an absolute coordinate can be obtained with a higher precision for an absolute position.

What is claimed is:

1. An article transport facility comprising:
a plurality of the article transport vehicles each of which is configured to travel along a track installed to extend by way of a plurality of article transfer locations;
position detectors each of which is configured to detect a position of corresponding one of the plurality of article transport vehicles along the track;
a managing controller configured to control operation of each of the plurality of article transport vehicles based on position information detected by the position detectors,
wherein each of the plurality of article transport vehicles includes a transport vehicle controller configured to cause corresponding one of the plurality of article transport vehicles to travel at least from a transport origin for an article to a transport destination, based on a command from the managing controller,
wherein the track includes a curved section, wherein markers are placed at a plurality of locations along a direction in which the track extends, each of the markers indicating an absolute position along the track,
wherein each of the plurality of article transport vehicles is provided with corresponding one of the position detectors, wherein each of the position detectors is configured to detect an absolute coordinate of corresponding one of the plurality of article transport vehicles along the track based on one or more of the markers, and is configured to provide position information including information on the absolute coordinate to at least other one or more of the article transport vehicles, through a wireless network, and
wherein the transport vehicle controller of a first of the plurality of article transport vehicles is configured to reduce a travel speed of the first of the plurality of the article transport vehicles based on position information of the first of the plurality of article transport vehicles and position information of a second of the plurality of article transport vehicles, if a separation distance between the first of the article transport vehicles and the second of the plurality of article transport vehicles along the track is less than, or equal to, a set separation distance specified in advance.

2. The article transport facility as defined in claim 1, wherein the plurality of the article transport vehicles are configured to communicate with each other through one wireless network, and wherein each of the plurality of article transport vehicles is configured to communicate with the managing controller through the one wireless network.

3. The article transport facility as defined in claim 1, wherein the track is of a type with ends including one end and an opposite end.

4. The article transport facility as defined in claim 1, wherein the transport vehicle controller of the first of the plurality of article transport vehicles is configured to reduce a travel speed of the first of the plurality of article transport vehicles, if a separation distance to another of the plurality of article transport vehicles that is located ahead with respect to a traveling direction of the first of the plurality of article transport vehicles, is less than, or equal to, the set separation distance.

5. The article transport facility as defined in claim 1, wherein the transport vehicle controller of the first of the plurality of article transport vehicles is configured to stop the first of the plurality of the article transport vehicles, if the separation distance is less than, or equal to, a restricting distance which is set to be less than the set separation distance.

6. The article transport facility as defined in claim 4, wherein the transport vehicle controller of the first of the plurality of article transport vehicles is configured to stop the first of the plurality of the article transport vehicles, if the separation distance is less than, or equal to, a restricting distance which is set to be less than the set separation distance.

7. The article transport facility as defined in claim 1, wherein each of the position detectors is configured to provide position information to the managing controller through the wireless network, wherein the managing controller is configured to control operation of each of the plurality of article transport vehicles based on one or more positions of the each of the plurality of article transport vehicles.

8. The article transport facility as defined in claim 1, wherein each of the markers includes a one-dimensional or two-dimensional barcode which indicates at least the absolute position, and
wherein each of the position detectors includes a camera configured to capture one or more images of one or more of the markers, and an image processor configured to recognize information about one or more absolute positions indicated by the one or more of the markers to detect the absolute coordinate of corresponding one of the plurality of article transport vehicles, based on one or more images taken by the camera.

9. The article transport facility as defined in claim 8, wherein the absolute coordinate has a resolution that is greater than a resolution that depends on the density of the markers installed at a plurality of locations.

* * * * *